United States Patent
Chen

(10) Patent No.: US 10,725,335 B2
(45) Date of Patent: Jul. 28, 2020

(54) COLOR FILTER SUBSTRATE, AND LIQUID CRYSTAL DISPLAY DEVICE HAVING COLOR FILTERS WITH DIFFERENT THICKNESSES

(71) Applicant: Shenzhen China Star Optoelectronics Technology Co., Ltd., Shenzhen, Guangdong (CN)

(72) Inventor: Shuai Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 299 days.

(21) Appl. No.: 15/323,790

(22) PCT Filed: Jan. 3, 2017

(86) PCT No.: PCT/CN2017/000033
§ 371 (c)(1),
(2) Date: Jan. 4, 2017

(87) PCT Pub. No.: WO2018/103169
PCT Pub. Date: Jun. 14, 2018

(65) Prior Publication Data
US 2018/0307094 A1    Oct. 25, 2018

(30) Foreign Application Priority Data

Dec. 7, 2016   (CN) .......................... 2016 1 11156949

(51) Int. Cl.
*G02F 1/1335*    (2006.01)
*G02F 1/1362*    (2006.01)

(52) U.S. Cl.
CPC .. *G02F 1/133516* (2013.01); *G02F 1/133514* (2013.01); *G02F 2001/136222* (2013.01)

(58) Field of Classification Search
CPC combination set(s) only.
See application file for complete search history.

(56) References Cited

U.S. PATENT DOCUMENTS 4,934,791 A * 6/1990 Shimizu ............ G02F 1/133516
                                                    252/582
2007/0002218 A1   1/2007 Park et al.
(Continued)

FOREIGN PATENT DOCUMENTS

| CN | 101013224 A | 8/2007 |
| CN | 101498802 A | 8/2009 |

(Continued)

*Primary Examiner* — Lauren Nguyen
(74) *Attorney, Agent, or Firm* — Andrew C. Cheng

(57) ABSTRACT

A color filter substrate, a liquid crystal panel, a liquid crystal display device and a manufacturing method are provided. The color filter substrate includes a base plate and multiple red color resists on the base plate. Wherein, a thickness of the multiple red color resists at an edge region is greater than a thickness of the multiple red color resists at a center region. In the present invention, a cell gap corresponding to the red color resists at the center region of the liquid crystal panel is greater than a cell gap corresponding to the red color resists at the edge region. Accordingly, the color shift at the edge region of the liquid crystal display panel is compensated to improve a red-shift phenomenon generated at the edge region of the liquid crystal display panel so as to increase the display quality of the liquid crystal display panel.

11 Claims, 3 Drawing Sheets

(56) References Cited

U.S. PATENT DOCUMENTS

| | | | |
|---|---|---|---|
| 2011/0290138 A1* | 12/2011 | Kim | B41M 1/06 |
| | | | 101/491 |
| 2012/0274889 A1 | 11/2012 | Sugisaka et al. | |
| 2016/0311856 A1* | 10/2016 | Krishna | C07K 14/005 |
| 2016/0341856 A1 | 11/2016 | Sun et al. | |

FOREIGN PATENT DOCUMENTS

| | | |
|---|---|---|
| JP | 2002098826 A | 4/2002 |
| KR | 1020060000277 A | 1/2006 |

* cited by examiner

COLOR FILTER SUBSTRATE, AND LIQUID CRYSTAL DISPLAY DEVICE HAVING COLOR FILTERS WITH DIFFERENT THICKNESSES

BACKGROUND OF THE INVENTION

1. Field of the Invention

The present invention relates to a display technology field, and more particularly to a color filter substrate, a liquid crystal panel, liquid crystal display device and a manufacturing method for the same.

2. Description of Related Art

The conventional Vertical Alignment (VA) display mode has advantages of high contrast ratio and no friction alignment such that the VA display mode has become a normal display mode for a large size liquid crystal display panel.

In the VA display mode, the liquid crystal molecules are stand vertically such that the VA display mode has a very high contrast ratio in a front side. However, when viewing at a side direction, the contrast ratio of the VA display mode is decreased obviously. The color of the picture easily generates a color shift. Specifically, when a user views at a center of the liquid crystal panel, an edge of the liquid display panel will generates a red-shift phenomenon.

SUMMARY OF THE INVENTION

Accordingly, the present invention provides a color filter substrate, a liquid crystal panel, a liquid crystal display device and a manufacturing method for the same, and the color filter substrate of the present invention can improve the color-shift problem of the liquid crystal display panel.

In order to solve the above technology problem, a technology solution provided by the present invention is:
providing a liquid crystal display device including a liquid crystal display panel and a driving circuit, wherein, the driving circuit is electrically connected to the liquid crystal display panel for driving the liquid crystal display pane, the liquid crystal display panel includes a color filter substrate, and the color filter substrate comprises:
a base plate;
multiple red color resists and multiple blue color resists disposed on the base plate;
wherein, a thickness of the multiple red color resists at an edge region of the base plate is greater than a thickness of the multiple red color resists at a center region of the base plate; a thickness of the multiple blue color resists at the edge region of the base plate is less than a thickness of the multiple blue color resists at the center region of the base plate; and
wherein, the base plate is divided into multiple regions from a center to an edge, thicknesses of the multiple red color resists on the multiple regions closer to the center of the base plate are smaller.

Wherein, thicknesses of the multiple blue color resists on the multiple regions closer to the edge of the base plate are smaller.

Wherein, multiple green color resists are further provided on the base plate, a thickness of the multiple green color resists at the edge region of the base plate is equal to a thickness of the multiple green color resists at the center region of the base plate.

Wherein, the base plate is a glass substrate or a TFT substrate.

Wherein, the color filter substrate further comprises a black matrix disposed at two adjacent color resists.

In order to solve the above technology problem, another technology solution provided by the present invention is: providing a color filter substrate comprising:
a base plate;
multiple red color resists disposed on the base plate;
wherein, a thickness of the multiple red color resists at an edge region of the base plate is greater than a thickness of the multiple red color resists at a center region of the base plate.

wherein, the base plate is divided into multiple regions from a center to an edge, thicknesses of the multiple red color resists on the multiple regions closer to the center of the base plate are smaller.

Wherein, multiple blue color resists are further provided on the base plate, a thickness of the multiple blue color resists at the edge region of the base plate is less than a thickness of the multiple blue color resists at the center region of the base plate.

Wherein, thicknesses of the multiple blue color resists on the multiple regions closer to the edge of the base plate are smaller.

Wherein, multiple green color resists are further provided on the base plate, a thickness of the multiple green color resists at the edge region of the base plate is equal to a thickness of the multiple green color resists at the center region of the base plate.

Wherein, the base plate is a glass substrate or a TFT substrate.

Wherein, the color filter substrate further comprises a black matrix disposed at two adjacent color resists.

In order to solve the above technology problem, another technology solution provided by the present invention is: providing a manufacturing method for a color filter substrate, comprising steps of: in a process of exposing a color filter substrate, using a mask that a transmittance of an edge region is greater than a transmittance of a center region to expose a color resist material for forming red color resists.

Wherein, the mask is divided into multiple regions from a center to an edge, the transmittance of the multiple regions of the mask closer to the center of the mask is smaller.

Wherein, the method further comprises a step of: in a process of exposing a color filter substrate, using a mask that a transmittance of an edge region is less than a transmittance of a center region to expose a color resist material for forming blue color resists.

Wherein, the mask is divided into multiple regions from a center to an edge, the transmittance of the multiple regions of the mask closer to the center of the mask is greater.

The color filter substrate provided by the present invention includes a base plate and multiple red color resists on the base plate. Wherein, a thickness of the multiple red color resists at an edge region is greater than a thickness of the multiple red color resists at a center region. In the present invention, a cell gap corresponding to the red color resists at the center region of the liquid crystal panel is greater than a cell gap corresponding to the red color resists at the edge region to reduce the difference of the red light of the transmittance at the center region and the transmittance at the edge region. Accordingly, a brightness ratio of the red light, the blue light and the green light at the edge region is similar to a brightness ratio of the red light, the blue light and the green light at the center region in order to improve a red-shift phenomenon generated at the edge region of the liquid crystal display panel so as to increase the display quality of the liquid crystal display panel.

DETAILED DESCRIPTION OF THE PREFERRED EMBODIMENT

In order to let the person skilled in the art to understood the technology solution of the present invention better, the following will combine the figures and the specific embodiments to describe a color filter substrate, a liquid crystal panel, a liquid crystal display device and a manufacturing method for the same in detail. In the figures, a same numeral in the entire specification and figures represents a same element.

A liquid crystal display panel generates different colors through controlling a brightness ratio of a red light, a green light and a blue light. Therefore, estimating a color-shift problem of a liquid crystal display panel in different viewing angles can be defined as estimating a problem of difference of brightness ratios of a red light, a green light and a blue light in different viewing angles of the liquid crystal display panel.

In the VA display mode of the liquid crystal display panel, the transmittance of the three colors can refer to a following formula:

$$T = \frac{1}{2}\sin^2(2\varphi)\sin^2\left(\frac{\pi \Delta nd}{\lambda}\right)$$

In the formula, $\varphi$ is an azimuth angle of liquid crystal molecules, $\Delta nd$ is a factor of the change in transmittance, wherein, $\Delta n$ is a difference of a normal light and an abnormal light caused by a birefringence property of liquid crystal molecules; d is a cell gap; $\lambda$ is a wavelength of a light incident to the liquid crystal molecules. In the VA display mode, the azimuth angle of liquid crystal molecules is a fixed value. However, in different viewing angles, corresponding factors of the change in transmittance $\Delta nd$ are different. Accordingly, in different viewing angles, the transmittance of the red light, the green light and the blue light are changed.

Figure 1:
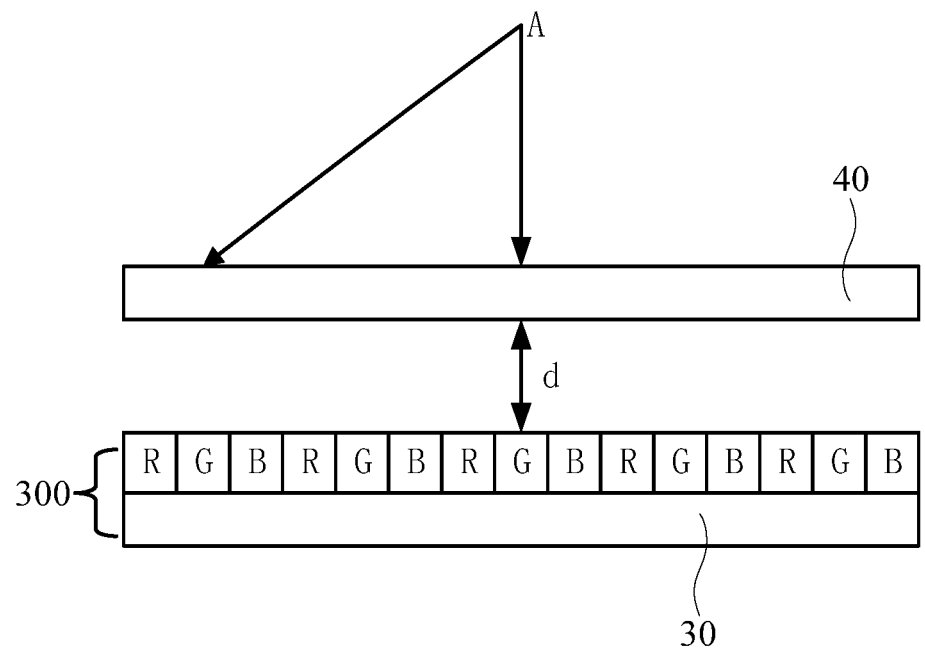
FIG. 1 is a schematic diagram of a liquid crystal display panel according to the conventional art.

With reference to FIG. 1, FIG. 1 is a schematic diagram of a liquid crystal display panel of the conventional art. The color filter substrate 300 of the liquid crystal display panel of the conventional art is shown as FIG. 1. On a lower base plate 30, red color resists R, green color resists G and blue color resists B are sequentially arranged. An upper substrate 40 is disposed oppositely to the lower base plate 30. Between the upper substrate 40 and the lower base plate 30, liquid crystal molecules are filled. Thicknesses of the three colors on the lower base plate 30 in the entire color filter substrate 300 of the conventional art are the same, and corresponding gaps d are the same.

When a user located at point "A" views the liquid crystal panel, a front view is formed with respect to a center region of the liquid crystal display panel, edge regions are all side views, and changes of view angles are the same. At this time, the factors of the changes in the transmittance $\Delta nd$ of the three colors are all decreased, and the variation amounts of the factors of the changes in the transmittance are the same. Assuming that the variation amount in the transmittance of the red light, the green light and the blue light are respectively $\Delta Tr$, $\Delta Tg$ and $\Delta Tb$. Because a relationship in wavelength among the red light, the green light and the blue light is $\lambda r > \lambda g > \lambda b$, according to the above formula, a relationship of the variation amount in the transmittance of the red light, the green light and the blue light is $\Delta Tr < \Delta Tg < \Delta Tb$. Therefore, from the center region to the edge region of the liquid crystal display panel the variation amount in the transmittance of the red light is smallest so that the brightness of the red light at the edge region of the liquid crystal display panel is highest such that when the user at the point "A" views the liquid crystal panel, the color at the edge region is shifted to red comparing to the center region so that a serious color-shift problem is existed.

Figure 2:
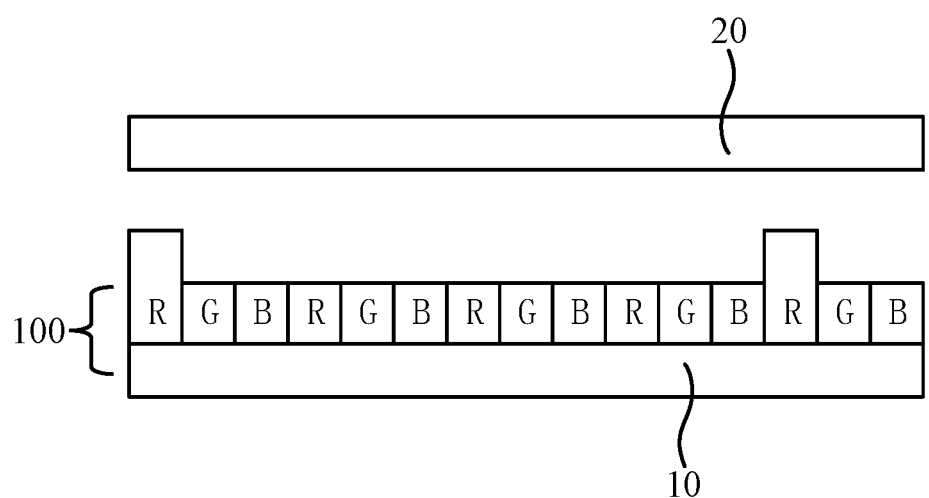
FIG. 2 is a schematic diagram of a liquid crystal display panel according to a first embodiment of the present invention.

With reference to FIG. 2, FIG. 2 is a schematic diagram of a liquid crystal display panel according to a first embodiment of the present invention. As shown in FIG. 2, the liquid crystal display panel includes a color filter substrate 100, and the color filter substrate 100 includes a base plate 10 and multiple red color resists R, the blue color resists B and green color resists G on the base plate 10. Wherein, thicknesses of the multiple red color resists R at an edge region of the base plate 10 is greater than thicknesses of the multiple color resists R at a center region of the base plate 10. That is, at the center region of the base plate 10, thicknesses of the red color resists R, the blue color resists B and the green color color resists G are the same. However, the thicknesses of the blue color resists B and the green color resists G at the edge region are the same as the thicknesses of the blue color resists B and the green color resists G at the center region. The thicknesses of the red color resists R at the edge region are greater than the thicknesses of the red color resists R at the center region. Besides, the liquid crystal panel also includes another substrate 20 right opposite to the color filter substrate 100. The liquid crystal molecules are filled between the color filter substrate 100 and the another substrate 20. The thicknesses of the green color resists G and the blue color resists B are the same on the entire base plate 10.

In the present embodiment, because the thicknesses of the red color resists R at the center region is less than the thicknesses of the red color resists R at the edge region such that a cell gap of the red color resists at the center region is greater than a cell gap of the red color resists at the edge region so that the transmittance of the red light at the edge region is less than the transmittance of the red light at the center region in order to decrease the brightness of the red light at the edge region of the liquid crystal display panel. When an user views the liquid crystal panel at a center location, from the center region to the edge region of the liquid crystal display panel, a variation amount in the transmittance of the red light is smaller than a variation amount in the transmittance of the red light in the conventional art such that a brightness ratio of the red light, the blue light and the green light is similar to a brightness ratio of the red light, the blue light and the green light at the center region in order to improve the red-shift phenomenon at the edge region of the liquid crystal panel.

The base plate 10 of the color filter substrate 100 in the present embodiment can be a glass base plate 10, or a TFT base plate 10. Because the color filter substrate 100 is used for filtering color in the liquid crystal panel so that the light pass through the liquid crystal display panel appears a corresponding color. According to the conventional manufacturing process, the base plate 10 of the color filter substrate 100 can be a glass base plate 10 or a TFT base plate 10.

In the present embodiment, the color filter substrate 100 is further provided with a black matrix (not shown in the figure). The black matrix is disposed between two adjacent color resists. For example, the black matrix is provided between the red color resists R and the green color resists G, the black matrix is provided between the green color resists G and the blue color resists B. Among the adjacent red color resists R, the adjacent green color resists G and adjacent blue color resists B, the black matrix is also provided.

Figure 3:
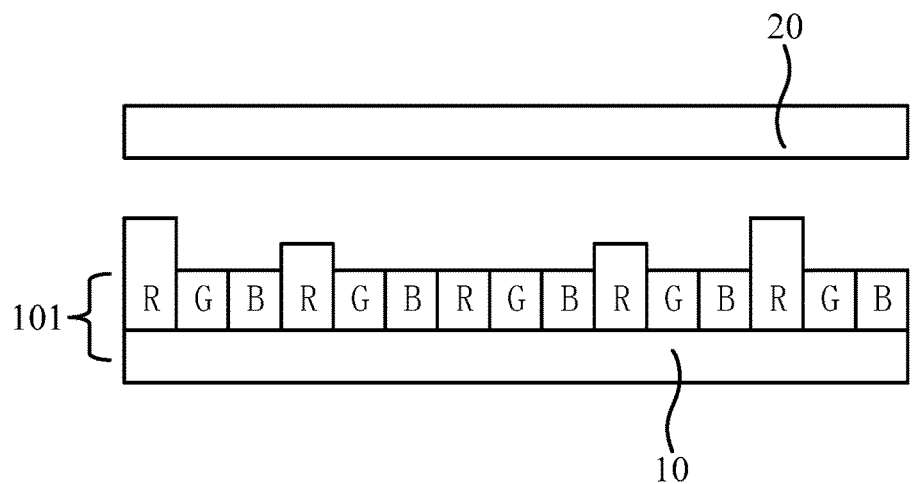
FIG. 3 is a schematic diagram of a liquid crystal display panel according to a second embodiment of the present invention.

Furthermore, with reference to FIG. 3, and FIG. 3 is a schematic diagram of a liquid crystal display panel according to a second embodiment of the present invention. The present embodiment is improved based on the liquid crystal display panel of the first embodiment shown in FIG. 2.

As shown in FIG. 3, in the color filter substrate 101 of the liquid crystal panel, dividing the base plate 10 from a center to an edge into multiple regions. The thicknesses of the red color resists R are smaller when closer to the center of the base plate 10. That is, in the multiple regions of the base plate 10, the thicknesses of the red color resists are changed as a gradient change. At the center region of the base plate 10, the thicknesses of the red color resists R, the blue color resists B and the green color resists G are the same. In an arbitrary one region of the base plate 10, thicknesses of the blue color resists B and the green color resists G are unchanged. It can be understood that when the base plate 10 is divided into multiple regions from the center to the edge, each region includes multiple red color resists R, the blue color resists B and the green color resists G. Besides, width of each region can be the same or be different.

Because the size of the liquid crystal panel is larger, when a user views a liquid crystal panel from a center region to an edge region, viewing angles of the user with respect to the liquid crystal panel are not changed suddenly, but gradually changed from the center region to the edge region of the liquid crystal panel. Accordingly, in the present embodiment, the base plate 10 is divided into multiple regions from the center to the edge such that the thicknesses of the red color resists R are as a gradient change from the center region to the edge region in the multiple regions so that a brightness ratio of the red light, the blue light and the green light of each region is similar to a brightness ratio of the red light, the blue light and the green light at the center region such that brightness ratios of the red light, the blue light and the green light on the entire liquid crystal panel tend to the same in order to improve the color shift problem of the liquid crystal display panel and increase the display quality.

Figure 4:
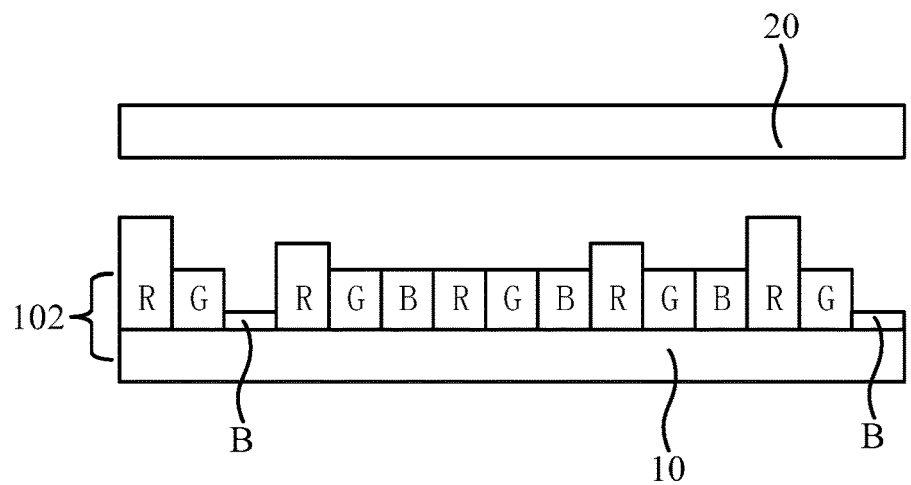
FIG. 4 is a schematic diagram of a liquid crystal display panel according to a third embodiment of the present invention.

With reference to FIG. 4, and FIG. 4 is a schematic diagram of a liquid crystal display panel according to a third embodiment of the present invention. The present embodiment is improved based on the liquid crystal display panel of the second embodiment. It can be understood that the arrangement of the thickness of the blue color resist B in the present embodiment can combine with the liquid crystal display panel of the first embodiment shown in FIG. 2.

As shown in FIG. 4, thicknesses of multiple blue color resists B disposed on the base plate 10 of the color filter substrate 102 located at the edge region is less than thicknesses of the multiple blue color resists B located at the center region.

According to the analysis of the color shift, because the wavelength of the green light is next only to a wavelength of the red light so that a variation amount in the transmittance of a green light is next only to a variation amount in the transmittance of the red light. Therefore, when a red-shift phenomenon at the edge region of the liquid crystal display panel is improved, a green-shift phenomenon is generated. In a liquid crystal display panel, a contribution of a brightness of the green color resist G is larger. If adopting a same method to increase the thicknesses of the green color resists G at the edge region of the base plate 10, the transmittance of the liquid crystal panel will decrease such that the brightness of the entire liquid crystal display panel is decreased so as to decrease the display quality. Accordingly, the method cannot be adopted.

In the present embodiment, the thicknesses of the green color resists G at the edge region on the base plate 10 are equal to the thicknesses of the green color resists G at the center region so that for the entire liquid crystal display panel, the entire brightness will not decrease. Because a color of a liquid crystal display panel is decided by a brightness ratio of the red light, the green light and the blue light, the present embodiment reduces the thicknesses of the blue color resists B at the edge region of the base plate 10 so as to increase the transmittance of the blue light at the edge region of the liquid crystal display panel. The above method is equal to decrease the brightness of the green light at the edge region so as to improve the green-shift phenomenon at the edge region in order to increase the display quality.

Figure 5:
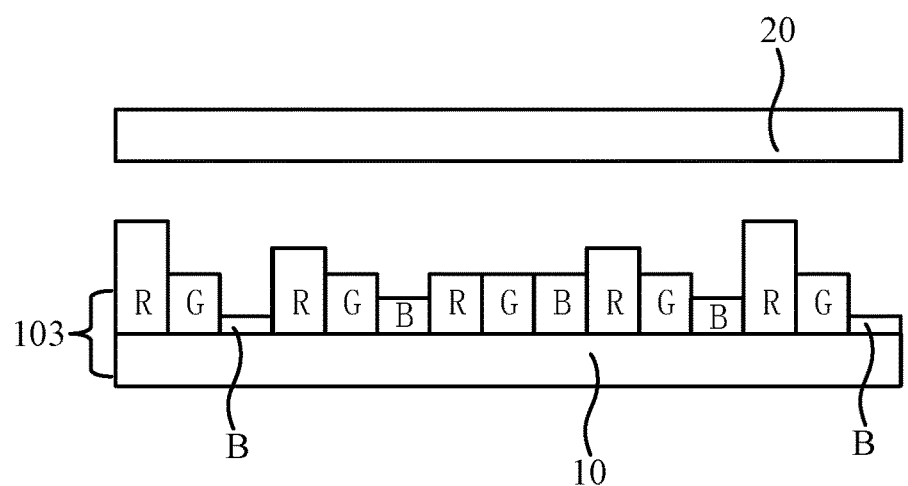
FIG. 5 is a schematic diagram of a liquid crystal display panel according to a fourth embodiment of the present invention.

With reference to FIG. 5, FIG. 5 is a schematic diagram of a liquid crystal display panel according to a fourth embodiment of the present invention. The present embodiment is improved based on the liquid crystal display panel of the third embodiment shown in FIG. 4.

As shown in FIG. 5, the color filter substrate 103 of the liquid crystal display panel is dividing the base plate 10 into multiple regions from a center to an edge, and the thicknesses of the blue color resists B closer to the edge region of the base plate 10 is smaller. That is, in the multiple regions of the base plate 10, a thickness change of the blue color resists B on the base plate 10 is a gradient change. It can be understood that the arrangement of the thicknesses of the blue color resist B in the present embodiment can combine with the arrangement of the red color resist R in the liquid crystal display panel of the first embodiment shown in FIG. 2.

In the present, when the base plate 10 is divided into multiple regions from the center to the edge, each region includes multiple red color resists R, multiple blue color resists B and multiple green color resists G. Besides, width of each region can be the same or be different.

The arrangement of the blue color resists B in the present embodiment is similar to the gradient arrangement of the thicknesses of the red color resists R. Because the size of the liquid crystal panel is larger, when a user views a liquid crystal panel from a center region to an edge region, viewing angles of the user with respect to the liquid crystal panel are changed gradually from the center region to the edge region of the liquid crystal panel. Accordingly, in the present embodiment, the base plate 10 is divide into multiple regions from the center to the edge such that the thicknesses of the blue color resists B present a gradient arrangement from the center region to the edge region in the multiple regions so that a brightness ratio of the red light, the blue light and the green light of each region on the liquid crystal panel is similar to a brightness ratio of the red light, the blue light and the green light at the center region of the liquid crystal panel such that the brightness ratios of the red light, the blue light and the green light on the entire liquid crystal panel tend to be consistent in order to improve the color-shift problem of the liquid crystal display panel and increase the display quality.

Figure 6:
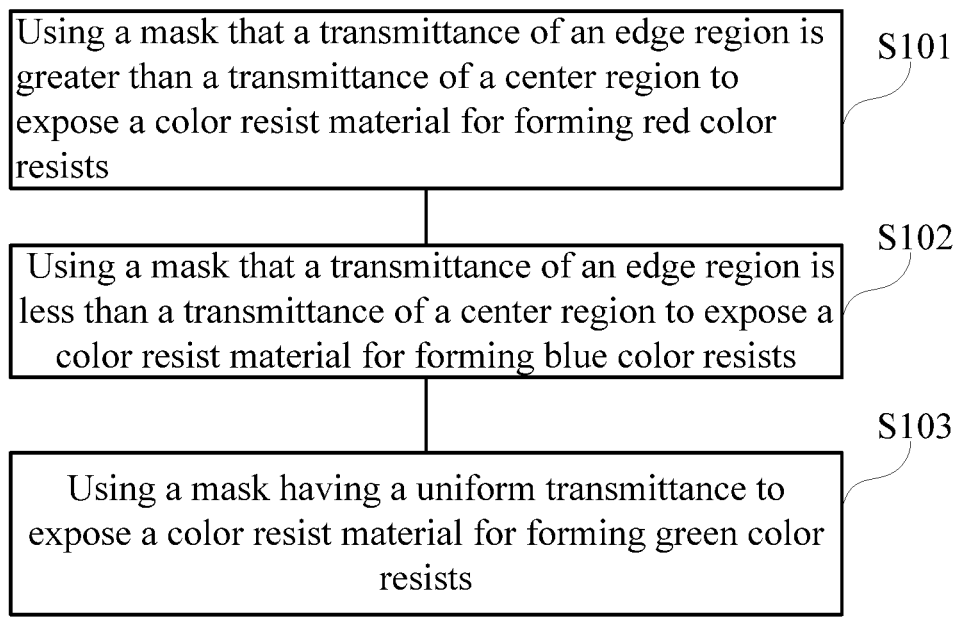
FIG. 6 is a flow chart of a manufacturing method for a color filter substrate according to an embodiment of the present invention.

With reference to FIG. 6, and FIG. 6 is a flow chart of a manufacturing method of a color filter substrate according to an embodiment of the present invention. As shown in FIG. 6, an exposure process of the color filter substrate of the present invention includes following steps:

S101: using a mask that a transmittance of an edge region is greater than a transmittance of a center region to expose a color resist material for forming red color resists.

Coating a color resist material for forming red color resist on the base plate of the color filter substrate. When exposing the color resist material for forming red color resist, using the mask that the transmittance of the edge region is greater than the transmittance of the center region to expose the color resist material for forming red color resists.

Because the color resist material is a negative material, when a received exposure amount is more, an exposure intensity is larger such that a curing degree of the color resist material is more thorough. Accordingly, when exposing the color resist material for forming red color resist coated on the base plate, using the mask that the transmittance of the edge region is greater than the transmittance of the center region such that an exposure intensity of the color resist material at the edge region is greater than an exposure intensity of the color resist material at the center region such that a curing degree of the color resist material at the edge region is greater than a curing degree of the color resist material at the center region. Accordingly, when using a developing solution to the color resist material for forming red color resists, a thickness of the red color resist at the edge region is greater than a thickness of the red color resist at the center region. The structure of the red color resists formed by the above method is as the structure of the red color resists R on the color filter substrate 100 in the liquid crystal display panel shown in FIG. 2.

Besides, the mask used for forming the color resist material for red color resists can be divided into multiple regions from a center to an edge such that an exposure intensity of the color resist material for forming red color resists closer to the center region of the substrate is smaller. Correspondingly, the thicknesses of the red color resists closer to the center region of the base plate are smaller. The structure of the red color resists formed by the above method is the structure of the red color resists R on the color filter substrate 101 in the liquid crystal display panel shown in FIG. 3.

S102: using a mask that a transmittance of an edge region is less than a transmittance of a center region to expose a color resist material for forming blue color resists.

Coating the color resist material for forming blue color resists on the base plate of the color filter substrate, when exposing the color resist material for forming blue color resist, using the mask that the transmittance of the edge region is less than the transmittance of the center region to expose the color resist material for forming blue color resist. The structure of the blue color resist formed by the above method is as the structure of the blue color resists B on the color filter substrate 102 in the liquid crystal display panel shown in FIG. 4.

Besides, the mask used for forming the color material for forming blue color resists can be divided into multiple regions from a center to an edge. The transmittance of the region of the mask closer to the center of the mask is greater such that an exposure intensity of the color resist material for forming blue color resists closer to the center region of the base plate is greater. Correspondingly, the thicknesses of the blue color resists closer to the center region of the base plate are greater. The structure of the blue color resists formed by the above method is the structure of the blue color resists B on the color filter substrate 103 in the liquid crystal display panel shown in FIG. 5.

Besides, the step 102 can also use a mask having an unchanged transmittance to expose the color resist material for forming blue color resists such that the thicknesses of the blue color resists on the color filter substrate are the same. The structure of the blue color resists formed by the above method is the structure of the blue color resist B on the color filter substrate 100 in the liquid crystal display panel as shown in FIG. 2.

S103: Using a mask having a uniform transmittance to expose a color resist material for forming green color resists.

Because thicknesses of the green color resists are the same on the entire base plate of the color filter substrate, using the mask having the uniform transmittance to expose the color resist material for forming green color resists.

It can be understood that the step S101, the step S102 and the step S103 are respectively used for exposing the color resist materials for forming red color resists, blue color resists and green color resists in order to form the red color resists, the blue color resists and the green color resists, which does not have an order relationship. Therefore, among the step S101, the step S102 and the step 103, the execution sequence is not limited.

The present invention further provides a liquid crystal display device. The liquid crystal display device includes a liquid crystal display panel and a driving circuit. Wherein, the driving circuit is electrically connected to the liquid crystal display panel and through the driving circuit to drive the liquid crystal display panel. The liquid crystal display panel in the present embodiment can be anyone of the liquid crystal display panels shown in FIG. 2 to FIG. 5.

In the present invention, the thicknesses of the red color resists at the edge region is greater than the thicknesses of the red color resists at the center region of the base plate of the color filter substrate such that a cell gap corresponding to the red color resists at the center region of the liquid crystal panel is greater than a cell gap corresponding to the red color resists at the edge region. Accordingly, the color shift at the edge region of the liquid crystal display panel is compensated to improve a red-shift phenomenon generated at the edge region of the liquid crystal display panel so as to increase the display quality of the liquid crystal display panel.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display device including a liquid crystal display panel and a driving circuit, wherein, the driving circuit is electrically connected to the liquid crystal display panel for driving the liquid crystal display pane, the liquid crystal display panel includes a color filter substrate, and the color filter substrate comprises:
a base plate; and
multiple red color resists and multiple blue color resists disposed on the base plate;
wherein, a thickness of the multiple red color resists at an edge region of the base plate is greater than a thickness of the multiple red color resists at a center region of the base plate; a thickness of the multiple blue color resists at the edge region of the base plate is less than a thickness of the multiple blue color resists at the center region of the base plate; and
wherein, the base plate is divided into multiple regions from a center to an edge, thicknesses of the multiple red color resists on the multiple regions closer to the center of the base plate are smaller;
wherein, the smallest thickness of the red color resists is equal to the biggest thickness of the blue color resists.

2. The liquid crystal display device according to claim 1, wherein, thicknesses of the multiple blue color resists on the multiple regions closer to the edge of the base plate are smaller.

3. The liquid crystal display device according to claim 1, wherein, multiple green color resists are further provided on the base plate, a thickness of the multiple green color resists at the edge region of the base plate is equal to a thickness of the multiple green color resists at the center region of the base plate.

4. A color filter substrate comprising:
a base plate; and
multiple red color resists disposed on the base plate;
wherein, a thickness of the multiple red color resists at an edge region of the base plate is greater than a thickness of the multiple red color resists at a center region of the base plate;
wherein, multiple blue color resists are further provided on the base plate, a thickness of the multiple blue color resists at the edge region of the base plate is less than a thickness of the multiple blue color resists at the center region of the base plate;
wherein, the smallest thickness of the red color resists is equal to the biggest thickness of the blue color resists.

5. The color filter substrate according to claim 4, wherein, the base plate is divided into multiple regions from a center to an edge, thicknesses of the multiple red color resists on the multiple regions closer to the center of the base plate are smaller.

6. The color filter substrate according to claim 4, wherein, thicknesses of the multiple blue color resists on the multiple regions closer to the edge of the base plate are smaller.

7. The color filter substrate according to claim 4, wherein, multiple green color resists are further provided on the base plate, a thickness of the multiple green color resists at the edge region of the base plate is equal to a thickness of the multiple green color resists at the center region of the base plate.

8. The liquid crystal display device according to claim 1, wherein, the thickness of the green color resists is constant, and is equal to the smallest thickness of the red color resists and the biggest thickness of the blue color resists.

9. The liquid crystal display device according to claim 1, wherein, a cell gap corresponding to the red color resists at the center region of the liquid crystal panel is greater than a cell gap corresponding to the red color resists at the edge region of the liquid crystal panel.

10. The color filter substrate according to claim 7, wherein, the thickness of the green color resists is constant, and is equal to the smallest thickness of the red color resists and the biggest thickness of the blue color resists.

11. The color filter substrate according to claim 4, wherein, a cell gap corresponding to the red color resists at the center region of the liquid crystal panel is greater than a cell gap corresponding to the red color resists at the edge region of the liquid crystal panel.

* * * * *